(No Model.)
W. R. LAMB.
FISHING APPARATUS.
No. 515,001. Patented Feb. 20, 1894.
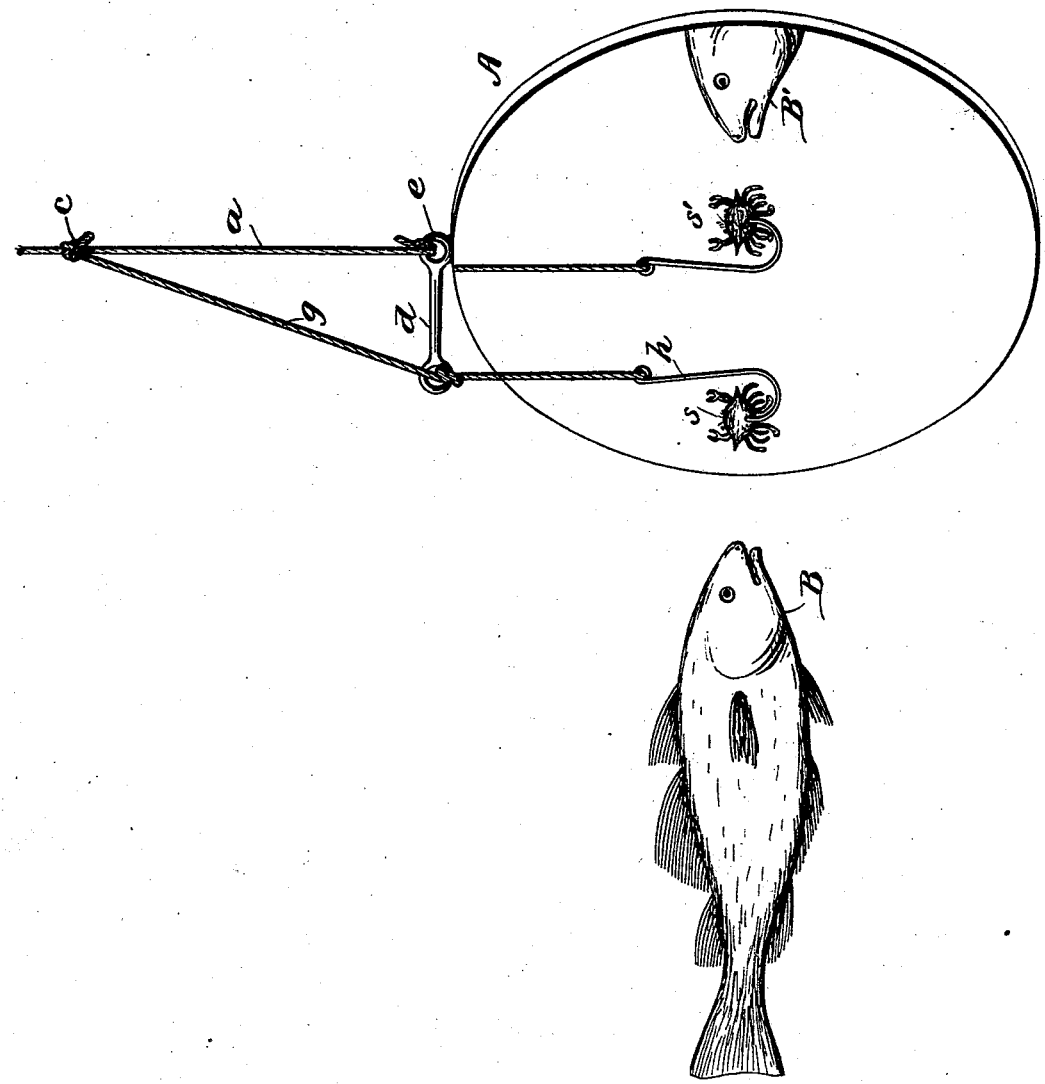
Witnesses.
Charles Hannigan
E. B. Read.
Inventor.
William R Lamb
by Benj Arnold
Atty.

United States Patent Office.

WILLIAM R. LAMB, OF EAST GREENWICH, RHODE ISLAND.

FISHING APPARATUS.

SPECIFICATION forming part of Letters Patent No. 515,001, dated February 20, 1894.

Application filed April 29, 1893. Serial No. 472,314. (No model.)

*To all whom it may concern:*

Be it known that I, WILLIAM R. LAMB, of East Greenwich, in the county of Kent and State of Rhode Island, have invented certain new and useful Improvements in Fishing Apparatus; and I do hereby declare that the following is a full, clear, and exact description thereof, reference being had to the accompanying drawing, and to the letters of reference marked thereon, which form a part of this specification.

This invention relates to that class of devices used as decoys in fishing, the object of it being to induce the fish to take the bait more readily. It is illustrated in the accompanying drawing, which may be explained as follows:

A, is a mirror, preferably of a circular or oval form, attached to a fishing line $a$, by means of a ring $e$, fast to the frame of the mirror. A short horizontal arm $d$, is carried out from the mirror frame at the same point that the ring $e$, is attached. This arm extends out a short distance in front of the mirror, and has at its outer end, a ring to receive a branch line $g$, the upper end of which is made fast to the main line $a$, at $c$. The short line $g$, is secured to the ring in the end of the arm where it passes through it, so that it shall serve as a stay to the arm, when a strain is put upon it in pulling in a fish. A hook $h$, is made fast to the end of the branch line $g$, just below the arm $d$, so as to come about opposite to the center of the mirror.

In using the apparatus, a bait $s$, (represented in this case as a small crab) is put on the hook $h$, and let down into the water with the mirror which serves as a sinker, until its lower edge just touches the bottom. In this position, the least pull on the hook on the branch line, will be felt very plainly by the hand at the upper end of the taut main line $a$. In this position, as shown in the drawing, the fish B, when approaching the bait $s$, will see the reflection B', of himself in the mirror, also coming for the reflection of the bait $s'$, and will be made bolder by the supposed companionship, and more eager to take the bait before his competitor seizes it. He will lose his caution, and take the bait with a recklessness that greatly increases the chances of his being caught on the hook. The reflection of light from the mirror in the water, will have in some degree the effect that the lighted torch has in some well known kinds of fishing, of attracting fish to the bait, and the light reflected by the mirror upon the bait, will make it more conspicuous.

The mirror may be made in two parts and secured together at an angle to each other, so as to have the effect of making two or more reflections of the same fish, and it may be made double so as to reflect on the back and front; or in the form of a triangle or square, with a mirror on each side, and an arm with the hook and bait before each reflecting surface, and also in the form of a cross, which would produce a multiplicity of reflections.

I do not limit my invention to the exact form or arrangements of the devices shown; but

I claim as my invention and desire to secure by Letters Patent—

In an apparatus for fishing, the combination of a mirror attached to a line, a line, and a hook for holding the bait fastened to said line in front of said mirror, substantially as described.

WILLIAM R. LAMB.

Witnesses:
D. MYRON GREENE,
BENJ. ARNOLD.